Sept. 13, 1966     R. S. TILLSON     3,272,953
EXTERNAL ACTUATOR HANDLE MECHANISM FOR ENCLOSED CIRCUIT BREAKER
Filed Feb. 8, 1965                                3 Sheets-Sheet 1
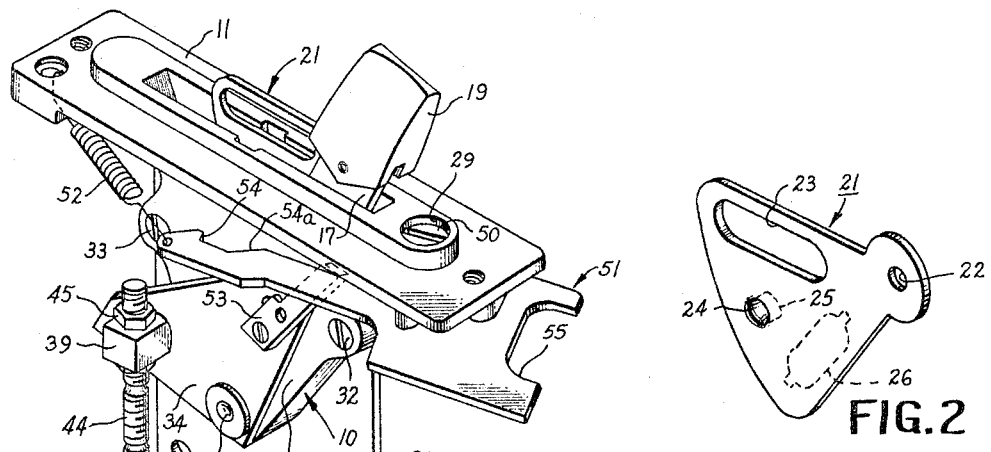
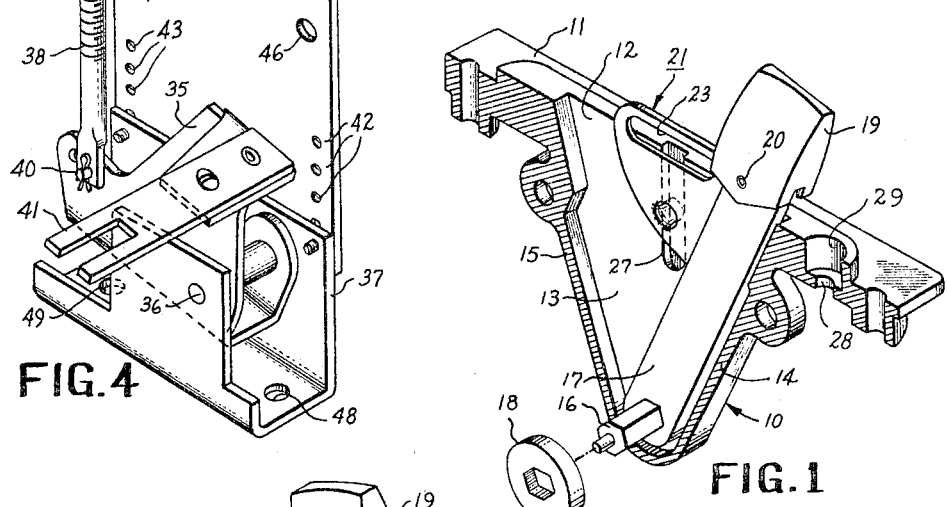
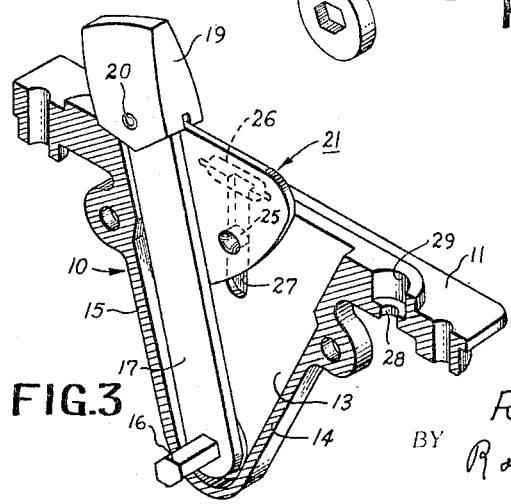
INVENTOR.
ROBERT S. TILLSON
BY Robert J. Casey
ATTORNEY Sept. 13, 1966   R. S. TILLSON   3,272,953
EXTERNAL ACTUATOR HANDLE MECHANISM FOR ENCLOSED CIRCUIT BREAKER
Filed Feb. 8, 1965   3 Sheets-Sheet 3

INVENTOR.
ROBERT S. TILLSON
BY Robert I. Casey
ATTORNEY

United States Patent Office 3,272,953
Patented Sept. 13, 1966

3,272,953
EXTERNAL ACTUATOR HANDLE MECHANISM
FOR ENCLOSED CIRCUIT BREAKER
Robert S. Tillson, Bristol, Conn., assignor to General
Electric Company, a corporation of New York
Filed Feb. 8, 1965, Ser. No. 430,801
14 Claims. (Cl. 200—172)

This invention relates to a safety handle mechanism, and more particularly to such a mechanism which is especially adapted to be used in conjunction with circuit breakers and disconnect switches mounted in enclosures of several different types, sizes, and configurations.

In the automotive industry and certain other heavy industrial applications, it is often desired or required for safety considerations that electrical distribution circuits furnishing power to the manufacturing plants and employing molded case circuit breakers of substantial current carrying capacity, i.e., of the order of up to approximately 1,200 amperes, or a fusible disconnect switch having such switch gear enclosed within a metal enclosure which usually has a door thereon equipped and adapted so that the door cannot be opened unless certain safety procedures have been complied with to disconnect the electrical circuits contained within the enclosure and interrupt the flow of electrical current therethrough. Such enclosures may typically include the so-called "vault-type" of enclosure and an appropriate handle mechanism is usually provided to operably engage the circuit breaker or disconnect means so that such circuit breaker or disconnect means can be operated from open circuit to close circuit conditions by an externally extending handle of the handle mechanism. Such handle mechanism may be flange-mounted or thru-door mounted in either left-hand or right-hand positions and should be adjustable to engage with a circuit breaker or fusible disconnect means mounted at different depths from the door of the enclosure as well as fixed and predetermined engagement by reason of conventionally spaced installations of the electric switch means with respect to the handle mechanism and the door of the enclosure.

Accordingly, it is a principal object of the present invention to provide a handle mechanism adapted to externally actuate an enclosed circuit breaker or disconnect means, which handle mechanism is adaptable to any one of numerous possible arrangements.

Another object of the present invention is to provide such a handle mechanism which may be readily adapted to adjustable engagement with such enclosed circuit breaker or disconnect switch means.

Yet another object of the present invention is to provide such a handle mechanism incorporating a basic unitary structure which is both strong and durable as well as being adaptable to being incorporated in a number of variant combinations of mechanisms as may be required by different arrangements of enclosed circuit breakers and disconnect switch means with which the handle mechanism may be operably engaged.

Yet another object of the present invention is to provide such a handle mechanism which has a safety interlock means readily adaptable to use with the several kinds of enclosures and positions of mounting switch means therein which may be desirable in different industrial applications.

A still further object of the present invention is to provide such a handle mechanism having means which is selectively adapted to lock both the external handle and the internal switch means with which it is engaged in either an "on" or "off" position as may be desired.

The invention in one form comprises a unitary die-cast body member having an escutcheon thereon and two spaced side walls extending perpendicularly from the escutcheon and joined by end walls to form an elongate enclosed recess. Such recess in the preferred embodiment of the present invention may take a substantially triangular configuration and appropriate handle pivot means is supported by the side walls for mounting a handle thereon which extends through an elongate slot in the escutcheon for selective reciprocal positioning. The handle pivot means extends externally from the side walls forming the recess of the body member and is operatively engaged with a switch operating means which is responsive to reciprocal movement of the handle for positioning such switch operating means in reciprocal positions. The switch operating means may comprise an appropriately configured member of a lever type engaged with the handle pivot means and carrying a handle engaging means for engaging a reciprocally operable member of a circuit breaker or fusible disconnect means mounted within the enclosure.

In another modified form, the handle mechanism and its associated switch operating means may comprise a first lever member which is engaged with the handle pivot means for reciprocal movement responsive to the position of the handle and a second lever means mounted appropriately adjacent to the switch means in the form of a circuit breaker or a fusible disconnect means so that the second lever means is engaged with a reciprocally operable member of such switch means to afford its operation to either closed circuit or open circuit condition as required.

Additionally, adjustable means may be provided to connect the first lever and the second lever so as to render the switch operating means adaptable to a variety of arrangements and dispositions of enclosed circuit breakers or fusible disconnect means. Appropriate interlock means are provided as part of the handle mechanism in its preferred embodiment to interlock the door of an enclosure while the handle mechanism is in its "on" position. Such interlock means is accessible through the escutcheon of the handle mechanism to be defeated by a screwdriver or similar tool. However, such defeat means is appropriately positioned and recessed so as not to be accessible by other than a proper tool such as a screwdriver, thus obviating the indiscriminate defeat of the interlock means by use of a coin or similar means.

These and other objects and features of the present invention will be more fully understood from the following detailed description of several embodiments together with the accompanying drawings and its scope will be pointed out in the appended claims.

In the drawings:

FIGURE 1 is a partially cross-sectional perspective view of several of the principal elements of a preferred embodiment of the present invention;

FIGURE 2 is a perspective view of the external locking means employed with the present invention;

FIGURE 3 is a partially cross-sectional perspective view of the principal elements of the present invention as shown in the preferred embodiment of FIGURE 1 with the external handle in the opposite reciprocal position to that shown in FIGURE 1;

FIGURE 4 is a perspective view of the present invention incorporating the principal members of the preferred embodiment of FIGURES 1, 2, and 3 and adapted for a thru-door installation with a switch operating means which is adjustable in accordance with the position of the switch which is to be reciprocally operated by the handle;

Figures 12, 13:
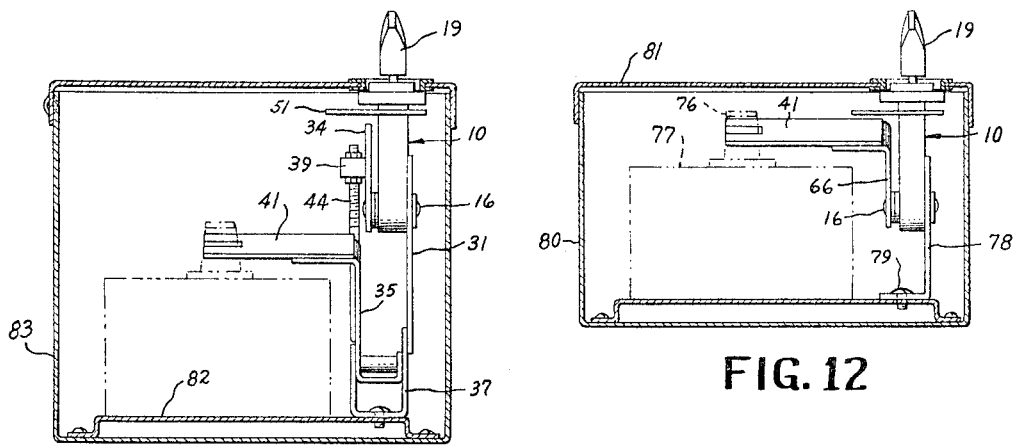

FIGURE 12 is an end elevational view showing a switch mechanism of the present invention in a thru-door mount and adapted for engagement with a switch means mounted within the enclosure in a conventionally pre-established disposition; and FIGURE 13 is an end elevational view showing a switch mechanism of the present invention in a thru-door installation and adapted to adjustably engage a reciprocally operable member of the switch means mounted within the enclosure.

Referring now to FIGURE 1, there is shown several of the principal elements of a handle mechanism of the present invention including a unitary die-cast body member shown generally at 10 which comprises an escutcheon 11 having an elongate slot 12 therein and including two integral side walls, only one of which is shown at 13 in the cross-sectional view of FIGURE 1. The side walls such as that shown at 13, it will be noted, are disposed at right angles to the major planar axis of the escutcheon 11, and in the preferred embodiment of the present invention as illustrated in FIGURE 1, there are also included integral end walls 14 and 15 forming an elongate recess beneath the slot 12 in the escutcheon 11.

It will be noted that the elongate recess formed by the side walls such as that shown at 13 and the two end walls as shown at 14 and 15 is of a generally triangular configuration in cross-sectional view. Disposed at the bottom of the recess is a handle pivot means 16 which supports a handle 17 extending through the slot 12 and adapted to be selectively positioned in either of two reciprocal dispositions. The handle pivot means 16, it will be appreciated, is rotatable with the reciprocal movement of the handle 17 due to its hexagonal configuration as illustrated in FIGURE 1. As will be apparent to those skilled in the art, any other appropriate configuration of the handle pivot means may be employed to render it pivotable in response to the reciprocal movement of handle 17. The handle pivot means is supported in appropriate bushing supports such as that shown at 17 and extends beyond the side wall (not shown) opposite to side wall 13 for engagement with a switch operating arrangement which will be explained more fully hereinafter. The handle 17 has affixed thereto by suitable pin means an insulating grip member 19 and the pin 20 also carries an external locking arrangement for pivotal movement about that point.

The external locking means is shown more fully in FIGURE 2 and is seen to comprise a triangular member 21 having an aperture therein 22 to receive the pin 20 and an elongate slot at 23 approximately parallel to one of the three sides forming the substantially triangular configuration of the locking member 21. Another aperture 24 carries a pin means 25 extending therefrom as illustrated by the dash-line outline. An elongate portion running generally parallel to another side of the generally triangular configuration of the external locking means 21 is shown at 26 and may be adapted for knock-out or drill-out as may be selectively desirable by the user of the handle mechanism and for purposes which will appear more fully hereinafter.

Referring now to FIGURE 1, the external locking member 21, it will be recalled, was described as being pivotally supported through an aperture 22 on the pin means 20, and the pin 25 is positioned to be slidingly engaged and retained within a slot 27 in the side wall 13 of the body member 10 of the handle mechanism. Thus, when the handle 17 is in the position shown in FIGURE 1 which is the "off" position, a lock means may be inserted through the slot 23 to effectively prevent the handle mechanism from being reciprocally positioned to the "on" position, therefore assuring that the handle mechanism and the switch means with which it is operably internally engaged within the enclosure will remain in the "off" condition until such lock is unlocked and removed from the slot 23. Upon removal of such lock, the reciprocally operable handle 17 may be positioned to the "on" condition, i.e., the opposite reciprocal position, by means of the insulating grip member 19 which is employed to manually move the handle 17 about its pivot point 16.

As shown in FIGURE 3, the external locking member 21 which, it will be recalled, is free to pivot about the pin 20 assumes a reciprocal position by reason of the retension of the pin 25 in the slot 27 so that the knock-out or drill-out portion 26 is now exposed above the escutcheon 11 of the handle mechanism. Accordingly, the knock-out or drill-out portion of the external lock member 21 may be drilled out or knocked out as desired to afford an elongate slot at 26, through which a lock can be positioned to lock the reciprocal handle member 17 in its "on" position. It should be noted that in the escutcheon 11 as illustrated in FIGURES 1 and 3 there is also included an aperture 28 concentric with a recess 29, the function and purpose of which will be more fully understood from the following description.

FIGURE 4 shows a complete embodiment of the handle mechanism of the present invention in an application which is adaptable for use in a thru-door installation to operate a switch means by adjustable engagement of the handle mechanism with a reciprocally operable member of an internally mounted switch means. In FIGURE 4, like members bear the same numerical designations as in FIGURES 1, 2 and 3. In FIGURE 4, the entire body member 10 is shown, including the side wall 30 which is spaced oppositely relative to side wall 13 as illustrated in FIGURES 1 and 3, and which sidewall 30 completes the enclosure of the elongate recess previously described. The body member 10 is supported upon a plate or frame member 31 by attachment thereto with screws 32 and 33 passing through the unitary die-cast body member 10. The handle pivot means 16 which, it will be recalled, was described as passing through the unitary body member 10 and being supported in a suitable bushing 18 such as was shown in FIGURE 1, is rotatably engaged with a lever plate 34 so that the entire plate 34 rotates in a reciprocal manner in response to the reciprocal positioning of the handle 17 by external manual movement. A second lever plate 35 is supported pivotally by a suitable pivot means 36 affixed to the end of the plate member 31 through a generally U-shaped support 37. A suitable connecting rod 38 connects a pivot point 39 of the lever plate 34 with an analogous pivot point 40 of the lower or second lever plate 35. Accordingly, the lower or second lever means 35 is reciprocally positioned responsive to the position of the upper or first lever means 34 which is movably pivotable with the handle member 17. The second lever means 35 is seen to carry in extension therefrom, a U-shaped member 41 which is engageable with a reciprocally operable member of the switch means encased within the enclosure and, accordingly, the internally mounted switch means will be operated and positioned in accordance with the operation and position of the external handle mechanism and more particularly the reciprocal movement of the handle member 17.

A plurality of apertures in the plate or frame member 31 as shown at 42 and 43 provide that the lower U-shaped frame member 37 may be positioned closer to or further removed from the escutcheon 11 of the handle mechanism in accordance with the disposition of the switch means internally mounted in the enclosure. The connecting member 38 is provided with a threaded screw as shown at 44 and a lock nut means as shown at 45 so that the connecting member 38 may similarly be adjusted in its connecting disposition to relate the movement of the handle mechanism to operate the reciprocally operable member of the switch means mounted within the enclosure. As will be appreciated by those skilled in the art, the embodiment of FIGURE 4 is adaptable to being mounted for thru-door installations by an appropriate bolt or screw means passing through the side of the enclosure and the plate or frame member 31 as provided by the apertures 46 and 47, or, alternatively, may be affixed to the bottom of the enclosure by suitable screw or bolt means passing through the apertures 48 and 49 in the U-shaped frame member 37. It will be recalled from the description of FIGURES 1 and 3 that the escutcheon 11 of the unitary body member 10 of the handle mechanism is provided with an aperture 28 recessed from the escutcheon by a counterbored type of recess 29 and, as seen in FIGURE 4, a slotted member 50 is positioned in such recess, through the aperture 28, and affixed to an interlock member 51. The interlock member 51 is spring biased by appropriate spring means 52 to assume a normal position generally parallel along its major axis to the pivotal path of the first or upper lever means 34. The lever plate 34 carries a member 53 which is pivotal therewith and moves generally in a path contiguous to the edge of the interlock member 51. Accordingly, when the handle 17 is moved pivotally from its "off" position as shown in FIGURE 4 towards its "on" position, the member 53 is rotated with the lever plate 34 and, due to the spring bias action of spring 52, the interlock means 51 and more particularly its latch portion 54 (most clearly shown in FIGURE 4) engages the member 53 preventing further movement of the handle 17 towards the "on" position. Such is the manner of operation of the interlock means 51 when the door of the enclosure is not closed. When the door of the enclosure is properly closed and positioned, means are provided responsive to locking the door latch to engage a lower U-shaped aperture 55 in the interlock means 51 so as to displace the interlock means in a counterclockwise direction permitting the actuation and reciprocal positioning of the handle means 17 to its "on" position, i.e., reciprocally opposite to the position shown in FIGURE 4. As is also most clearly shown in FIGURE 4, the interlock means 51 is provided with a cam surface 54a along its edge which engages with member 53 upon pivotal movement of the handle 17 from its "on" to "off" position to displace the interlock means 51 in a counterclockwise direction.

Figure 5:
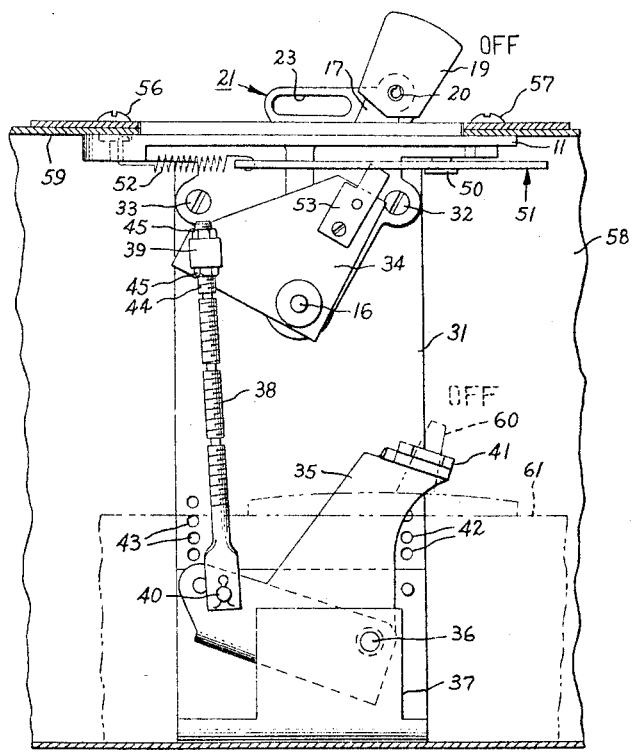
FIGURE 5 is a side elevational view of the handle mechanism of the present invention flange-mounted within an enclosure and having an adjustable switch operating means adapted to accommodate and engage switches positioned at different spacial disposition with respect to the cover of the enclosure which encases the switch means.
Figure 6:
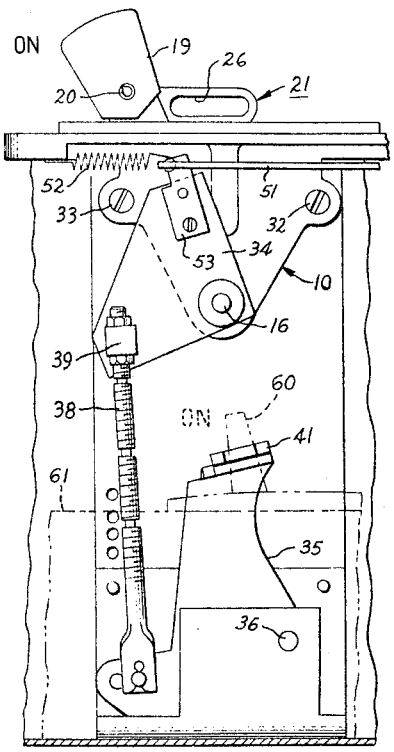
FIGURE 6 is a side elevational view of the handle mechanism illustrated in FIGURE 5 and shown positioned in its reciprocal position so as to actuate the switch means to its "on" condition.

Referring now to FIGURE 5, there is illustrated an embodiment of the present invention substantially similar to that illustrated in FIGURE 4 as mounted in an enclosure shown generally at 58 and more particularly mounted on the flange member 59 of the enclosure 58 by appropriate means such as the two screw means 56 and 57 passing through the escutcheon 11 of the body member 10 of the handle mechanism. In FIGURE 5, like members bear the same numerical designation as in FIGURES 1, 3, and 4. The externally extending handle member 17 is shown in its "off" reciprocal position and the lever plate means 34 connected through the handle pivot support means 16 is rotatable about the pivot point 16 in response to reciprocal movement of the handle 17. The lever means 34 connected to a second or lower lever means 35 through an appropriate connecting rod 38 is operative to position the second lever means 35 in accordance with the disposition and reciprocal movement of the externally operable handle means 17. The second or lower lever means 35 is engaged through member 41 with the reciprocally operable member 60 of a circuit breaker or fusible disconnect means as generally indicated by the dash-line outline at 61. Thus, when the reciprocally operable handle 17 of the handle mechanism of the present invention is positioned from its "off" position as shown in FIGURE 5 to its "on" position as shown in FIGURE 6, the reciprocally operable member 60 of the internally mounted switch mechanism 61 is commensurately positioned in its "on" position. It will also be noted that in such "on" position the second locking aperture 26 of the external locking plate 21 is exposed by reason of its rotation about its pivot point of support on pivot pin 20 thus affording a means of locking the handle mechanism in its "on" position, effectively retaining the internally mounted switch mechanism 61 in its commensurate "on" position.

In the installation of a handle mechanism embodying the present invention, the adjustable switch operating means is installed as follows: the lower U-shaped portion of the frame or support member 37 is adjusted by means of the series of paired apertures to a position suitable for the depth of the enclosure 58 and more particularly the position of the switch means 61 mounted within the enclosure 58. The connecting rod 38 is then attached to the second lever plate 35 by appropriate means such as the pivot pin 40 and the rod 38 passed through the pivotable connector 39 which is movably supported on the upper lever plate 34. The external handle mechanism 17 is positioned in its extreme "off" position and similarly the reciprocally operable switch operating means 60 of the internally mounted switch means 61 is positioned in its extreme "off" position. The lock nut means 45 are then adjusted on the threaded portion 44 of the connecting rod 38 so that both the externally operable handle 17 of the handle mechanism and the reciprocally operable member 60 of the internal switch means 61 are in the same relative "off" position. The external handle means 17 is then pivotally moved to its "on" position and the position of the reciprocally operable switch operating means 60 of the internally mounted switch means 61 is observed and inspected to assure that it is fully positioned to its proper "on" condition. If the switch operating means 60 has not been reciprocally moved to its full "on" position, the disposition of the adjustable connecting rod 34 is adjusted by appropriately positioning the lock nut means 45 on the threaded portion 44 of the connecting rod 38 so as to assure such proper disposition of the switch operating means 60. Thus, proper positioning and response of the internally mounted switch means 61 is assured by appropriate disposition of the adjustable connecting linkage of the handle mechanism of the present invention.

Figure 7:
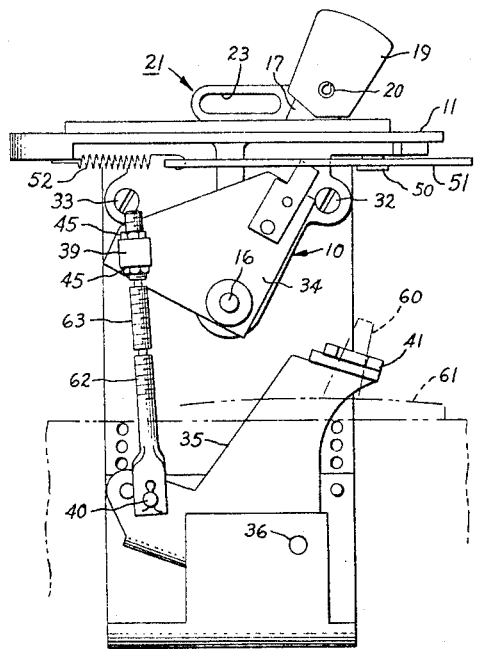
FIGURE 7 is a side elevational view of a handle mechanism of the present invention of the type illustrated in FIGURES 5 and 6 illustrating its adjustability to accommodate a switch means which is positioned closer to the external handle portion of the operating mechanism.

Referring now to FIGURE 7, there is shown a handle mechanism of the present invention in an embodiment similar to that illustrated in connection with FIGURES 4, 5 and 6 but employs a shorter connecting link adjusted to operate a switch mechanism internally mounted within an enclosure disposed at a different depth from the cover than was the case with the installations illustrated in FIGURES 5 and 6. In FIGURE 7 like members bear the same numerical designations as in FIGURES 4, 5 and 6. As is shown in FIGURE 7, the unitary body member 10 including the escutcheon 11, the parallel side walls defining an elongate, generally triangular cross-section recess and supporting therein a handle pivot means 16, is substantially as has been illustrated and described in connection with FIGURES 1 through 6.

Similarly, the lower lever member 35 is the same as has been disclosed and described in connection with FIGURES 4, 5 and 6 and is employed to reciprocally position the switch operating means 60 associated with the internally mounted switch means 61. It will be noted, however, that the rod 62 connecting the upper level means 34 with the lower lever means 35 in FIGURE 7 is considerably shorter than that illustrated and described in connection with FIGURES 5 and 6.

However, it is affixed at its end points by appropriate means such as the pin 40 adjacent the lower lever arm 35 and the pivotal connecting means 39 associated with the upper level means 34 in a manner similar to the connecting rod shown and described in connection with FIGURES 5 and 6. The connecting rod 62 of FIGURE 7 has a threaded portion 63 which is adaptable to receive locking means such as the nuts 45 to be adjustably positioned thereon so as to properly relate the reciprocal motion between "on" and "off" positions of the external extending handle 17 to commensurately operate the switch operating means 60 of the internally mounted switch means 61.

Figure 8:
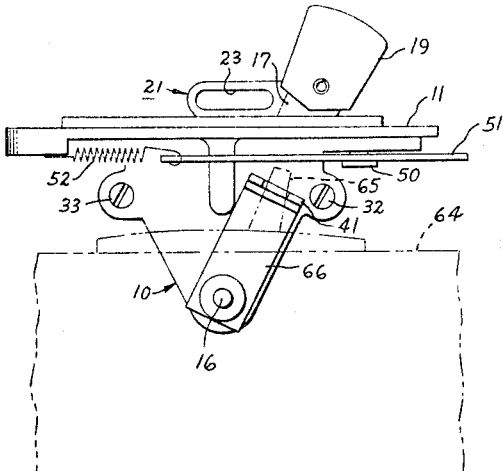
FIGURE 8 is a side elevational view of an embodiment of the present invention showing the handle mechanism mounted for engagement with a switch means positioned in a fixed conventionally pre-established disposition within the enclosure.

FIGURE 8 shows a further variant installation of the present invention wherein the handle mechanism of the present invention is mounted in a fixed, unadjustable relation to the internally mounted switch means so as to be engageable therewith for operation generally in a manner previously described with respect to the adjustably mounted handle mechanisms. In FIGURE 8 like members bear the same numerical designations as in previously described illustrations. In FIGURE 8, a switch means 64 is internally mounted within an enclosure in a conventionally pre-established position and its extending switch operating means 65 is shown to be considerably closer to the cover of the enclosure than was the case in any of the previously described embodiments and installations as illustrated in FIGURES 5, 6 and 7. Thus, the pivotable handle support 16 carries a member 66 which is configured and adapted to engage the switch operating means 65 directly without adjustment and is responsive to be pivotably moved about the pivotal support means 16 in accordance with the movement and disposition of the externally extending handle 17. Accordingly, the fixed depth installation as illustrated in FIGURE 8 is operable to engage and position the switch operating means of the internally mounted switch in generally the same manner as was described in connection with the illustrations of FIGURES 5, 6 and 7.

Figures 9, 10, 11:
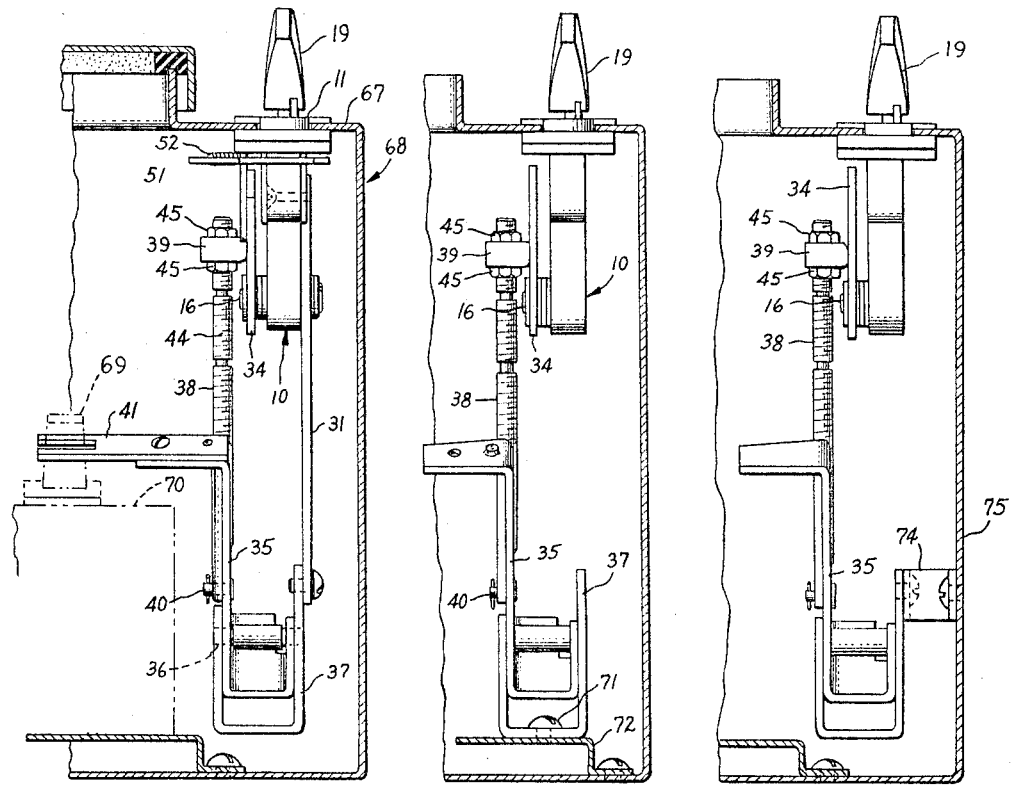
FIGURE 9 is an end elevational view of the handle mechanism of the present invention flange-mounted so as to be adjustable to engage a switch means within the enclosure.
FIGURE 10 is an end elevational view of a flange-mounted switch mechanism of the present invention showing another arrangement adapted to be adjustably engaged with a switch mounted within the enclosure.
FIGURE 11 is an end elevational view showing a switch mechanism of the present invention which is flange-mounted and incorporates yet another arrangement for adjustable engagement with a switch means mounted within the enclosure.

FIGURE 9 illustrates a still further variant installation of the handle mechanism of the present invention wherein the escutcheon of the handle mechanism together with the body member is supported on a flange portion of the enclosure within which the switch means to be operated is mounted. The general configuration of the handle mechanism and its operatively engaged members is substantially the same in FIGURE 9 as that illustrated in connection with FIGURE 5 except that in FIGURE 9 the installation is shown in end view and as being completely depended from and supported upon the flange of the enclosure. In FIGURE 9, the integral body member 10 including its escutcheon 11 is mounted upon the flange portion 67 of an enclosure shown generally at 68. Affixed thereto and depending therefrom, the plate member 31 supports a lower U-shaped member 37 in the manner previously described in connection with FIGURE 5. However, the lower member 37 is not supported in any other manner except by plate 31, the secondary or lower lever member 35 carrying a slotted member 41 which is adapted and positioned to engage the switch operating member 69 of an intenally mounted switch means 70.

Thus, the flange-mounted installation in FIGURE 9 has the entire handle mechanism supported by the flange portion 67 of the enclosure itself 68.

By contrast, the illustration of FIGURE 10 shows a similar variable depth, adjustable installation which is flange-mounted in the manner described in connection with FIGURE 9 but has the U-shaped lower member 37 appropriately supported by screw means 71 on a bracket 72 which is affixed to the back of the enclosure 73. Thus, in the absence of the plate member 31, the U-shaped lower member supports the lower or secondary lever 35 for its reciprocal operation to actuate the switch operating mechanism such as 69 shown in FIGURE 9.

In further contrast, the illustration of FIGURE 11 shows a similarly flange-mounted handle mechanism of the present invention with the lower U-shaped frame or bracket member 37 supported by an appropriate bracket means 74 affixed to the side wall of the enclosure 75. Thus, the lower portion of the handle mechanism is supported by the side wall of the enclosure itself for an adjustable depth, flange-mounted installation which is operable in the general manner described in connection with the embodiment illustrated in FIGURE 9.

The illustration of FIGURE 12 shows a thru-door mount of fixed depth installation wherein the handle mechanism of the present invention operates to actuate the switch operating means of the internally mounted switch 77 in much the same manner as was previously described in connection with the illustration of FIGURE 8. In FIGURE 12, like members bear the same numerical designations as in FIGURE 8.

FIGURE 13 illustrates a thru-door installation employing a switch mechanism adaptable to operably engage and actuate switch means which may be mounted within an enclosure at variable depths. As shown in FIGURE 13, the second or lower lever 35 and the bracket 37 which supports it are fixedly mounted relative to a bracket 82 supported upon the back of the enclosure 83. The bracket 37 also supports the unitary body member for thru-door installation by means of the plate 31 mutually affixed between those two members.

From the foregoing disclosure and descriptions of several embodiments of the safety handle mechanism of the present invention, it will be apparent to those skilled in the art that a high degree of versatility and facility of application is afforded by and inherent in its concept. As hereinbefore described, the handle mechanism of the present invention may be employed with both molded case circuit breakers and fusible disconnect means mounted at variable depths within enclosures that may be of the flange-mounting type or the thru-door mounting type, for example. As can be readily appreciated from the foregoing description and disclosures, the handle mechanism of the present invention is readily adaptable in addition to either right-hand or left-hand installations and, may be employed to operably engage and actuate enclosed switch means which may typically take the form of fusible disconnect means having a current carrying capacity of from 15 to 1,200 amperes. In all such installations the switch mechanism of the present invention is especially adaptable to being mounted completely independently of the door of the safety enclosure within which the switch means is mounted.

Further features of the handle mechanism of the present invention are its positive up-down operation, permanent mounting in the enclosure affording more usable interior enclosure space, its exterior locking means selectively adaptable to locked positions "on" and "off" as desired, "coin-proof" interlock means, and durable, ruggedized construction all of which are especially well-suited to withstand heavy industrial use and its attendant vibration, exposure to contaminants and other deleterious environmental factors.

While I have disclosed only certain embodiments of the invention, it will be readily appreciated that many modifications thereof may be made. I therefore intend by the appended claims to cover all such modifications as fall within the true spirit and scope of the invention.

What I claim as new and desire to secure by Letters Patent of the United States is:

1. A handle mechanism comprising: an escutcheon having an elongate slot therein; a body portion integral with said escutcheon and extending in a planar axis in general alignment with said slot; handle pivot means carried by said integral body portion; a handle extending through said slot and supported by said handle pivot means for selective reciprocal positioning; and means engaged with said handle pivot means adjacent said body portion for reciprocal movement responsive to the positioning of said handle, said means being adapted to engage and reciprocally operate separate switch means.

2. A handle mechanism comprising: an escutcheon having an elongate slot therein; a body portion integral with said escutcheon and including two spaced walls extending from the sides of said slot along a planar axis in general alignment with said slot; handle pivot means carried by said integral walls; a handle extending through said slot and supported by said handle pivot means for selective reciprocal positioning; and switch-operating means engaged with said handle pivot means external of said walls for reciprocal movement responsive to the positioning of said handle, said means being adapted to engage and reciprocally operate separate switch means.

3. A handle mechanism as claimed in claim 2 and including an enclosure having a back wall, opposed side walls and end walls perpendicular thereto, and a cover hingedly mounted for enclosing its front opening; an elongate aperture in said cover; a switch means mounted within said enclosure and having a reciprocally operable member; and wherein said handle mechanism is supported by one of said walls and positioned for its switch-operating means to engage said reciprocally operable member of said switch means and its escutcheon is disposed to register with said elongate aperture and its handle pass therethrough.

4. A handle mechanism as claimed in claim 2 and including an enclosure having a back wall, opposed side walls and end walls perpendicular thereto, a flange extending into the front opening of said enclosure contiguous to one of said side walls and a cover hingedly mounted for enclosing said front opening; a switch means having a reciprocally operable member and mounted within said enclosure; and an elongate aperture in said flange, said handle mechanism being supported upon said flange with its escutcheon in alignment with said aperture and positioned for its switch-operating means to engage said reciprocally operable member of said switch means.

5. A handle mechanism as claimed in claim 2 and including an enclosure having a back wall, opposed side walls and end walls perpendicular thereto, and a cover hingedly mounted for enclosing its front opening; an elongate aperture in said cover, said handle mechanism being supported by one of said walls for its escutcheon to register with said aperture and its handle to pass therethrough; a switch means mounted within said enclosure and having a reciprocally operable member; and wherein said switch operating means comprises a first lever engaged with said handle pivot means for reciprocal movement responsive to the positioning of said handle, a second lever means mounted adjacent said switch means in engagement with its reciprocally operable member, and a connecting means between said first and second levers adapted to be adjusted in length for positioning said second lever and reciprocally operating said switch means in response to the position of said handle.

6. A handle mechanism as claimed in claim 2 and including an enclosure having a back wall, opposed side walls and end walls perpendicular thereto, a flange extending into the front opening of said enclosure contiguous to one of said side walls and a cover hingedly mounted for enclosing said front opening; an elongate aperture in said flange, said handle mechanism being supported upon said flange with its escutcheon in register with said aperture and its handle passing therethrough; a switch means mounted within said enclosure and having a reciprocally operable member; and wherein said switch-operating means comprises a first lever engaged with said handle pivot means for reciprocal movement responsive to the positioning of said handle, a second lever means mounted adjacent said switch means in engagement with its reciprocally operable member, and a connecting means between said first and second levers adapted to be adjusted in length for positioning said second lever and reciprocally operating said switch means in response to the position of said handle.

7. A handle mechanism comprising: an escutcheon having an elongate slot therein; parallel walls formed integrally with said escutcheon and extending from each side of said slot in generally triangular configuration; handle pivot means carried by said walls within the vertex portions opposite said slot; a handle extending through said slot and supported by said handle pivot means for selective reciprocal positioning; and lever means engaged with said handle pivot means external of said walls for reciprocal movement responsive to the positioning of said handle, said lever means being adaptable to connect with linkage for reciprocally operating separate switch means.

8. A handle mechanism comprising: a unitary die-cast body member having an escutcheon, two spaced side walls extending perpendicular therefrom and joined by end walls forming an elongate enclosed recess therein; handle pivot means supported by said side walls; a handle mounted on said handle pivot means and extending beyond said escutcheon for selective reciprocal positioning; and switch-operating means engaged with said handle pivot means external of said body member for reciprocal movement responsive to the positioning of said handle, said means being configured and adapted to engage and reciprocally operate separate switch means.

9. A handle mechanism as claimed in claim 8 wherein said elongate enclosed recess is generally triangular in configuration along a section between said side walls.

10. A handle mechanism as claimed in claim 8 and having a handle locking means comprising a plate pivotally engaged with said handle external of said recess, said plate having an aperture configured to accept a lock therethrough and disposed to be accessible when said handle is in one of its reciprocal positions; a pivot pin carried by said plate within said recess and engaged with one of said side walls for causing pivotal movement of said plate upon movement of said handle to the other of its reciprocal positions, said pivotal movement positioning said slot within said recess and inaccessible to accept a lock therethrough.

11. A handle mechanism as claimed in claim 10 wherein said plate includes a portion adapted to be optionally removed therefrom to form a second aperture therein, said second aperture being disposed to be accessible to accept a lock therethrough when said handle is positioned to render said first aperture inaccessible.

12. A handle mechanism as claimed in claim 8 and including interlock means supported beneath said escutcheon for biased pivotal movement substantially normal to the path of reciprocal movement of said switch operating means; a latch portion carried by said interlock means, said latch portion being configured to restrainingly engage said switch operating means in one direction of its reciprocal movement; and means extending through said escutcheon for pivotally displacing said interlock means out of the path of reciprocal movement of said switch operating means.

13. A handle mechanism as claimed in claim 12 wherein said last-named means is recessed from the face of said escutcheon.

14. A handle mechanism as claimed in claim 12 and mounted within an enclosure having a hinged front cover, said cover carrying means disposed to be restrainingly engaged by said interlock means upon closing said door and released therefrom upon pivotal displacement of said interlock means.

References Cited by the Examiner

UNITED STATES PATENTS

| | | | |
|---|---|---|---|
| 2,418,006 | 3/1947 | Bangert | 200—172 |
| 2,752,464 | 6/1956 | Seeger | 200—172 |
| 2,765,383 | 10/1956 | Cooper et al. | 200—172 |
| 3,009,029 | 11/1961 | Bodenschatz et al. | 200—172 X |
| 3,042,779 | 7/1962 | Gauthier | 200—172 |
| 3,141,947 | 7/1964 | Daly et al. | 200—172 |

ROBERT K. SCHAEFER, *Primary Examiner.*

H. O. JONES, *Assistant Examiner.*